United States Patent [19]
Gaddis et al.

[11] Patent Number: 4,762,619
[45] Date of Patent: Aug. 9, 1988

[54] METHOD OF FORMING DYNAMIC MEMBRANE ON STAINLESS STEEL SUPPORT

[75] Inventors: Joseph L. Gaddis; Craig A. Brandon, both of Clemson, S.C.

[73] Assignee: The United States of America as represented by the Administrator of the National Aeronautics and Space Administration, Washington, D.C.

[21] Appl. No.: 898,449

[22] Filed: Aug. 19, 1986

Related U.S. Application Data

[63] Continuation of Ser. No. 755,960, Jul. 17, 1985, abandoned, which is a continuation of Ser. No. 119,334, Feb. 7, 1980, abandoned.

[51] Int. Cl.$^4$ ............................................. B01D 13/04
[52] U.S. Cl. .................................... 210/639; 210/653; 210/500.25; 210/500.35; 427/245; 427/247
[58] Field of Search .............. 210/653, 652, 502, 506, 210/500.25, 639, 500.35; 55/158; 427/244, 245, 246, 247; 264/41, 45.8; 755/960

[56] References Cited

U.S. PATENT DOCUMENTS

| | | | |
|---|---|---|---|
| 3,022,187 | 2/1962 | Eyraud et al. | 210/500 M |
| 3,331,772 | 7/1967 | Brownscombe et al. | 210/500 M |
| 3,344,928 | 10/1967 | Kraus et al. | 210/500 M |
| 3,449,245 | 6/1969 | Johnson et al. | 210/502 |
| 3,577,339 | 5/1971 | Baird et al. | 210/653 |
| 3,926,799 | 12/1975 | Thomas et al. | 210/500 M |

OTHER PUBLICATIONS

Thomas, D. G., "Dynamic Membranes . . . ", in *Reverse Osmosis and Synthetic Membranes*, S. Sourirajan, Editor; Nat. Res. Con. of Canada, 1977, pp. 295-312.

*Primary Examiner*—Peter Hruskoci
*Attorney, Agent, or Firm*—Hardie R. Barr; John R. Manning; Edward K. Fein

[57] ABSTRACT

A suitable member formed from sintered, powdered, stainless steel is contacted with a nitrate solution of a soluble alkali metal nitrate and a metal such as zirconium in a pH range and for a time sufficient to effect the formation of a membrane of zirconium oxide on the stainless steel support, the membrane preferably including an organic polymeric material such as polyacrylic acid.

9 Claims, No Drawings

METHOD OF FORMING DYNAMIC MEMBRANE ON STAINLESS STEEL SUPPORT

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

This application is a continuation of application Ser. No. 755,960, filed July 17, 1985, now abandoned, which is a continuation of Ser. No. 119,334, filed Feb. 7, 1980, now abandoned.

DESCRIPTION

1. Technical Field

The present invention relates to a method of forming a hyperfiltration member employing a membrane dynamically formed on a stainless steel support.

"Dynamic" membranes of various solute-rejecting substances deposited on the surface of porous supports or substrates can be used in hyperfiltration methods to remove contaminating chemicals from aqueous solutions by reverse osmosis. Such reverse osmosis membranes may be used in desalination and other water purification equipment, and have potential application in the textile industries for separating dyes from aqueous solvents.

2. Background Art

Prior art methods for forming dynamic membranes on porous supports such as for example, ceramic supports, have utilized what may be described as chloride chemistry in that the hydrous metal oxide membrane was deposited on the support utilizing chloride salts of the metal. Alternately, the hydrous metal oxides, in a slurry or in colloidal suspension can be deposited on the supports.

U.S. Pat. No. 3,577,339 to Baird et al, teaches the formation of zirconium oxide membranes on a porous stainless steel substrate utilizing a solution containing hydrous zirconium oxide to form a solute-rejecting membrane. U.S. Pat. No. 3,413,219 to Kraus et al discloses the formation of dynamic membranes of zirconium oxides and other metals capable of forming hydrous oxides, the membranes being formed by contacting a porous support with an aqueous solution containing colloidal particles of a polyvalent metal capable of forming the hydrous metal oxides.

Other methods of forming dynamic membranes of hydrous metal oxides on stainless steel members such as tubes, pipes and the like are disclosed in U.S. Pat. No. 3,331,772 to Brownscombe et al, U.S. Pat. No. 3,344,928 to Kraus et al, U.S. Pat. No. 3,449,245 to Johnson et al and U.S. Pat. No. 3,926,799 to Thomas et al.

As the prior art discussed above shows, methods for depositing dynamic membranes such as, for example, zirconium oxide-polyacrylic acid membranes on porous supports are well established. However, until now it has not been possible to form such membranes on stainless steel supports without severely corroding the stainless steel in the process. Nonetheless, supports made from stainless steel are attractive, and indeed necessary in certain environments utilizing hyperfiltration technology because of the inherently stronger structural features of such stainless steel supports.

DISCLOSURE OF INVENTION

It is therefore an object of the present invention to provide a method of forming a dynamic membrane on a stainless steel support without unduly corroding the stainless steel support.

Another object of the present invention is to provide a method of forming a member, useful in hyperfiltration applications, which possesses excellent structural integrity by avoiding the corrosion products attending the presence of chlorine in the process.

The above and other objects of the present invention will become apparent from the description given herein and the appended claims.

In accordance with the method of the present invention, a support, in suitable form, of sintered, powdered stainless steel is contacted with an aqueous solution of the nitrate salt of a polyvalent metal and a soluble alkali metal nitrate in a pH range of from about 3 to about 5, for a time sufficient to form a hydrous metal oxide membrane on the support.

Especially desirable membranes are formed by the addition of an organic polymer such as polyacrylic acid.

BEST MODE FOR CARRYING OUT THE INVENTION

The porous support used in the method of the present invention is comprised of powdered stainless steel formed in a suitable configuration and sintered into a porous solid of substantial strength. While the support can take many forms for maximum efficiency and utilization of the membrane, the support is generally in the form of a tube, the membrane being formed on either the inside or the outside of the tube. It is to be understood however that the invention is not limited to any particular form and can be used in the coating of irregular surfaces, many of which cannot be uniformly coated with a filter aid by prior art in situ coating methods. The use of sintered powdered metallurgy to provide tubes, plates and other such porous forms is well known and need not be described in detail here. By control of powder size, initial forming compaction, and sintering conditions, the tubes or other formations may be produced having controlled porosity. Formations, e.g., tubes, having a nominal porosity of about 2 to about 30% and pore ratings (based on absolute particle retention) of from about 0.2 to about 20 microns in diameter are usually satisfactory for purposes of the invention. A range of from about 0.2 to about 10 microns is also useful.

In forming the membranes of the present invention, an aqueous nitrate solution of a suitable polyvalent metal and a soluble alkali metal nitrate is employed. Examples of typically useful salts are the nitrates of tri and tetravalent metals such as iron, zirconium, tin (IV) and thorium. Particularly preferred as the membrane-forming metal is zirconium, zirconium nitrate (also known as zirconyl nitrate) being an especially preferred salt. In general, metallic nitrates such as those noted above which are capable of forming hydrous metal oxide membranes are desired. The aqueous nitrate solution of the membrane forming metal contains, in addition, a soluble metal nitrate such as an alkali metal nitrate, e.g., sodium or potassium nitrate. Generally speaking, the nitrate salt of the membrane forming metal will be present in an amount of from about 0.01 to about 0.10 grams per liter while the soluble metal nitrate, e.g., sodium or potassium nitrate, will be present in amounts of from about 0.01 to about 0.10 moles per liter. The pH of the aqueous nitrate solution has a pH of below about 5 and is generally from about 3 to about 5, a pH of about 4 being particularly preferred.

Although not necessary, a filter aid can be used with advantage in the method of the present invention. Suitable, non limiting examples of filter aids which can be used include diatomaceous earth, perlite, asbestos fibers, cellulose fibers, dried-silica gel and carbon. Powdered carbon has been found to be an especially desirable filter aid.

While useful membrane formation is accomplished, according to the present invention, using only the aqueous nitrate solution of hydrous oxide forming metals described above, a particularly desirable membrane can be formed by the addition of certain organic polymers such as for example, polyacrylic acid. When a polymeric material such as polyacrylic acid is employed, the aqueous nitrate solution is further acidified, preferably with nitric acid, to avoid the presence of chlorine and the products of chlorine corrosion of stainless steel, to reduce the pH to between 1.5 and 2.5, preferably about 2. A suitable amount of the organic polymers, as for example from about 20 to about 100 and preferably 50 ppm, is then added to the aqueous nitrate solution. The pH of the solution is then slowly brought to neutral using sodium hydroxide or some other suitable basic material.

In the method of the present invention, the stainless steel support is contacted with the aqueous nitrate solution, the nitrate solution being circulated past and through the porous stainless steel member, e.g., the tube, either in the presence or absence of the inert filter aid. Contact between the support and the aqueous nitrate solution is maintained until the flow rate through the support diminishes indicating that the hydrous metal oxide membrane has formed. The time may range from seconds to hours depending on the applied pressure, the pore size, the concentration of the aqueous nitrate solution and other such parameters.

To further illustrate the invention, the following non-limiting example is presented.

EXAMPLE

An aqueous solution of approximately 0.025 molar sodium nitrate and containing about 0.04 grams per liter of zirconium nitrate at a pH of 4 was circulated past and through a porous stainless steel tube prepared from sintered, powdered stainless steel. Flow rate through the tube diminished to an average velocity of from about $10^{-4}$ m/sec. to $5 \times 10^{-3}$ m/sec. at an applied pressure of $4 \times 10^6$ to $7 \times 10^6 N/m^2$. At this point the solute rejecting membrane of zirconium oxide had formed on the stainless steel tube. The electrical conductivity of the throughflow was significantly lower than the feed flow conductivity indicating substantial salt rejection by the membrane. At this point nitric acid was added to lower the pH to about 2 and approximately 50 parts per million of polyacrylic acid was added to the solution. The pH was slowly brought to neutral by the addition of sodium hydroxide to the solution to complete the formation of a zirconium oxide-polyacrylic acid membrane. It was found that the electrical conductivity of the throughflow or filtrate from the tube was typically from 5 to 10% of the conductivity of the feed solution at a throughflow velocity in the range of from about 3 to about $5 \times 10^{-5}$ m/sec.

As the above example demonstrates, the method of the present invention permits the formation of a highly efficient solute rejecting membrane directly on the sintered stainless steel tube. As noted above, the production of iron salts formed by normal chloride chemistry deposition processes prohibits membranes of good quality. The use of the nitrate salts allows formation of the membrane without production of the iron salts which would normally occur with acid chloride solutions reacting with the stainless steel tube. It will be readily appreciated that because the supports employed are made of stainless steel, the present invention permits fabrication of membrane systems capable of high reliability in many severe mechanical environments such as might be associated with flight conditions.

The dynamic membrane formed according to the present invention can be used in numerous applications where it is desirable to separate contaminants from aqueous solutions by reverse osmosis. For example, the membranes may be used in the dyeing process in the textile industry where separation of the dyeing material from its aqueous solution permits recovery and reuse of the dye.

From the above description, it is apparent that numerous modifications may be made in the method of the present invention without departing from the spirit or scope thereof. Accordingly, it is intended that the invention be limited only by the appended claims.

We claim:

1. A method of preparing a hyperfiltration member including the steps of:
    forming a porous stainless steel substrate from powdered stainless steel using suitable particle size, compression and sintering conditions to yield a porous stainless steel substrate having a nominal porosity of from about 2% to about 30% and an absolute particle retention pore rating of from about 0.2 micron to about 20 microns in diameter;
    flowing through and about and in contact with the porous substrate, an effective amount of an aqueous nitrate solution comprising zirconium nitrate, and also a material selected from the group consisting of soluble sodium nitrate and soluble potassium nitrate to form a solute rejecting membrane of zirconium oxide on said stainless steel substrate;
    continuing the flow of the aqueous nitrate solution through and about the porous substrate at a flow rate and pressure and for period of time effective to form the zirconium oxide membrane on the porous substrate;
    adding to the aqueous nitrate solution nitric acid sufficient to lower the pH to between 1.5 to about 2.5;
    adding to the aqueous nitrate solution polyacrylic acid in the amount of from about 20 to about 100 parts per million;
    slowly adding to the aqueous nitrate solution sodium hydroxide until the aqueous nitrate solution is neutral to form a zirconium oxide-polyacrylic acid membrane on said substrate;
    performing all steps in the absence of chlorine or chlorine compounds.

2. A method of claim 1 wherein said aqueous nitrate solution is applied to said support in the presence of an inert, non solute-rejecting filter aid material.

3. The method of claim 2 wherein said filter aid material comprises powdered carbon.

4. The method of claim 1 wherein said porous stainless steel substrate has a pore rating, based on absolute particle retention, of about 0.2 to about 10 microns.

5. The method of claim 4 wherein said support comprises a tube.

6. The method of claim 1 wherein the aqueous nitrate solution contains zirconium nitrate in the amount of about 0.4 grams per liter.

7. The method of claim 1 wherein the material selected from the group is approximately 0.025 molar sodium nitrate.

8. The method of claim 1 wherein the aqueous nitrate solution contains zirconium nitrate in the amount of about 0.04 grams per liter, the material selected from the group is approximately 0.025 molar sodium nitrate, the nitric acid is added until the pH is about 2, and approximately 50 parts per million of the polyacrylic acid is added to the aqueous nitrate solution.

9. A method of filtering an aqueous solution by forming a membrane on a substrate, comprising the steps of:
circulating an aqueous nitrate solution at a pH of about 4 past and through a porous stainless steel tube prepared from sintered, powdered stainless steel, the aqueous nitrate solution containing approximately 0.025 molar sodium nitrate and further containing about 0.04 grams per liter of zirconium nitrate, at a flow rate and pressure and for a period of time effective to form a solute rejecting membrane of zirconium oxide on the stainless steel tube,
adding nitric acid sufficient to lower the pH of the aqueous nitrate solution to about 2;
adding approximately 50 parts per million of polyacrylic acid to the aqueous nitrate solution;
slowly adding sodium hydroxide to the aqueous nitrate solution to bring the pH to neutral to form a zirconium oxide-polyacrylic acid membrane on the stainless steel tube;
performing all steps in the absence of chlorine; and
filtering the aqueous nitrate solution by flowing it through the stainless steel tube at a throughflow velocity in the range of about 3 to about $5 \times 10^{-5}$ m/sec.

* * * * *